United States Patent
Poster

(10) Patent No.: US 11,680,500 B2
(45) Date of Patent: *Jun. 20, 2023

(54) OIL FILTER WITH IMPENDING AND FULL-BYPASS INDICATORS

(71) Applicant: Bell Textron Inc., Forth Worth, TX (US)

(72) Inventor: Scott David Poster, Arlington, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 194 days.

This patent is subject to a terminal disclaimer.

(21) Appl. No.: 17/164,136

(22) Filed: Feb. 1, 2021

(65) Prior Publication Data

US 2021/0254518 A1   Aug. 19, 2021

Related U.S. Application Data

(62) Division of application No. 15/705,803, filed on Sep. 15, 2017, now Pat. No. 10,941,683.

(Continued)

(51) Int. Cl.
*F01M 11/10* (2006.01)
*B01D 35/143* (2006.01)
(Continued)

(52) U.S. Cl.
CPC ........... *F01M 11/10* (2013.01); *B01D 35/143* (2013.01); *B64C 27/12* (2013.01); *F01M 1/10* (2013.01);
(Continued)

(58) Field of Classification Search
CPC .......... F01M 11/10; F01M 1/10; F01M 11/03; F16H 57/0404; F16N 29/00;
(Continued)

(56) References Cited

U.S. PATENT DOCUMENTS 2,517,150 A * 8/1950 Webb ...................... B64C 27/54
416/30
2,802,548 A * 8/1957 Mart .................... F16H 57/0415
184/104.1

(Continued)

FOREIGN PATENT DOCUMENTS

EP   3299287 A1   3/2018
GB   913414      12/1962
WO   2007060418 A1   5/2007

OTHER PUBLICATIONS

Bell Helicopter Textron Inc., "Bell 525 Relentless" Poster, Nov. 12, 2014.

(Continued)

*Primary Examiner* — Henry Y Liu
(74) *Attorney, Agent, or Firm* — Edwin S. Flores; Daniel J. Chalker; Chalker Flores, LLP

(57) ABSTRACT

A removable oil filter system includes an oil filter mount, an oil filter element removably connected to the oil filter mount, an impending-bypass indicator connected to the oil filter mount and in fluid communication with an oil in the oil filter system, and a full-bypass indicator in fluid communication with the oil filter mount. The impending-bypass indicator is capable of reporting an impending-bypass condition of the oil filter system. The full-bypass indicator is capable of reporting a full-bypass condition of the oil filter system.

14 Claims, 5 Drawing Sheets

Related U.S. Application Data

(60) Provisional application No. 62/423,371, filed on Nov. 17, 2016, provisional application No. 62/399,097, filed on Sep. 23, 2016.

(51) Int. Cl.
*B64C 27/12* (2006.01)
*F16H 57/04* (2010.01)
*F01M 1/10* (2006.01)
*F01M 11/03* (2006.01)
*F16N 29/00* (2006.01)

(52) U.S. Cl.
CPC ......... *F01M 11/03* (2013.01); *F16H 57/0404* (2013.01); *F16H 57/0405* (2013.01); *F16N 29/00* (2013.01)

(58) Field of Classification Search
CPC .. B01D 35/143; B01D 35/147; B01D 27/101; B01D 27/103
USPC .......................................................... 184/6.4
See application file for complete search history.

(56) References Cited

U.S. PATENT DOCUMENTS

| | | | | |
|---|---|---|---|---|
| 2,879,892 | A * | 3/1959 | Frakes | B01D 35/147 200/81.9 R |
| 3,644,915 | A * | 2/1972 | McBurnett | B01D 35/143 200/81.9 R |
| 3,790,931 | A * | 2/1974 | Leveraus | F02M 35/08 210/90 |
| 3,794,168 | A * | 2/1974 | Perkins | B01D 35/147 210/90 |
| 3,819,052 | A * | 6/1974 | Firth | B01D 35/143 210/90 |
| 3,941,958 | A * | 3/1976 | Flesburg | B01D 35/143 200/82 R |
| 4,142,973 | A * | 3/1979 | Kachman | B01D 35/143 210/90 |
| 4,153,003 | A * | 5/1979 | Willis | G01M 13/00 116/DIG. 25 |
| 4,246,109 | A * | 1/1981 | Manders | B01D 27/103 210/90 |
| 4,366,837 | A * | 1/1983 | Roettgen | F16K 37/00 210/90 |
| 4,423,751 | A * | 1/1984 | Roettgen | F16K 17/0413 210/90 |
| 4,498,495 | A * | 2/1985 | Worwood | B01D 35/143 210/90 |
| 4,654,140 | A * | 3/1987 | Chen | B01D 35/143 210/90 |
| 4,818,385 | A * | 4/1989 | Medley, III | B01D 35/143 210/DIG. 17 |
| 4,829,850 | A * | 5/1989 | Soloy | B64D 35/08 74/606 R |
| 4,885,082 | A * | 12/1989 | Cantoni | B01D 27/144 210/90 |
| 5,239,861 | A * | 8/1993 | Fujita | B01D 35/143 73/61.73 |
| 5,310,020 | A * | 5/1994 | Martin | F04D 29/063 184/104.1 |
| 5,339,776 | A * | 8/1994 | Regueiro | F01M 1/16 123/196 AB |
| 5,526,782 | A * | 6/1996 | Bedi | F01M 11/061 123/196 A |
| 5,676,842 | A * | 10/1997 | Bedi | F01M 11/0458 210/171 |
| 5,702,592 | A * | 12/1997 | Suri | B01D 35/143 210/90 |
| 5,968,371 | A * | 10/1999 | Verdegan | F16N 39/06 184/6.24 |
| 6,084,187 | A * | 7/2000 | Buecker | B01D 29/114 200/82 E |
| 6,446,907 | B1 * | 9/2002 | Wilson | F16N 31/002 244/17.11 |
| 6,652,740 | B2 * | 11/2003 | Schoess | B01D 37/046 210/90 |
| 7,523,646 | B2 * | 4/2009 | Klun | G01N 33/2888 73/53.07 |
| 9,925,479 | B1 * | 3/2018 | Nishikawa | B01D 15/02 |
| 2005/0284802 | A1 * | 12/2005 | Jankuski | B01D 35/30 210/744 |
| 2007/0040559 | A1 * | 2/2007 | Klun | G01N 33/03 324/453 |
| 2007/0187308 | A1 * | 8/2007 | Weinberger | B01D 27/103 210/420 |
| 2008/0121575 | A1 * | 5/2008 | Pabst | F01M 11/03 210/85 |
| 2012/0006151 | A1 * | 1/2012 | DeDe | F02C 7/32 210/450 |
| 2012/0025529 | A1 * | 2/2012 | Davis | F03D 80/70 702/179 |
| 2012/0080384 | A1 * | 4/2012 | Reinosa | B01D 35/306 210/695 |
| 2012/0118800 | A1 * | 5/2012 | Lauer | B01D 37/046 210/348 |
| 2012/0240879 | A1 * | 9/2012 | Kishi | F01N 3/055 123/41.31 |
| 2012/0247874 | A1 * | 10/2012 | Poster | B64C 27/82 184/6.12 |
| 2013/0309091 | A1 * | 11/2013 | Homeyer | F01D 25/18 416/23 |
| 2013/0332045 | A1 * | 12/2013 | Uluyol | F16N 29/00 701/102 |
| 2014/0225377 | A1 * | 8/2014 | Turner | H02K 7/1861 290/1 R |
| 2014/0263819 | A1 * | 9/2014 | Wilson | B64D 27/00 244/17.11 |
| 2015/0129727 | A1 * | 5/2015 | Marsar | B01D 35/30 248/94 |
| 2016/0033463 | A1 * | 2/2016 | Robertson | A47J 37/1223 99/330 |
| 2016/0290481 | A1 * | 10/2016 | Campbell | F16H 57/0436 |
| 2016/0320257 | A1 * | 11/2016 | Oakes | G01L 23/24 |
| 2018/0087419 | A1 | 3/2018 | Poster | |

OTHER PUBLICATIONS

Perry, Dominic , "Analysis: Bell 525 Relentless cutaway and Technical Description" Flight International, Nov. 14, 2014, London, https://www.flightglobal.com/news/articles/analysisbell525relentlesscutawayandtechnical405541/.
European Patent Office, Communication pursuant to Article 94(3) for EP Appl. No. 17192699.1 dated May 25, 2018, 5 pp.
European Patent Office, Communication pursuant to Article 94(3) for EP Appl. No. 17192699.1 dated Dec. 5, 2018, 5 pp.
European Patent Office, European Search Report for EP Appl. No. 17192699.1 dated Feb. 14, 2018, 4 pp.

* cited by examiner

OIL FILTER WITH IMPENDING AND FULL-BYPASS INDICATORS

CROSS-REFERENCE TO RELATED APPLICATIONS

This patent application is a divisional patent application of U.S. patent application Ser. No. 15/705,803 filed on Sep. 15, 2017 entitled "Oil Filter with Impending and Full-Bypass Indicators", which claims priority to U.S. provisional patent application Ser. No. 62/399,097 filed on Sep. 23, 2016 entitled "Improved Helicopter Transmission System" and U.S. provisional patent application Ser. No. 62/423,371 filed on Nov. 17, 2016 entitled "Improved Helicopter Transmission System," all of which are hereby incorporated by reference in their entirety.

STATEMENT OF FEDERALLY FUNDED RESEARCH

Not applicable.

TECHNICAL FIELD OF THE INVENTION

The present invention relates in general to the field of rotorcraft, and more particularly to methods and systems for lubricating and cooling rotorcraft components and systems.

BACKGROUND OF THE INVENTION

Without limiting the scope of the invention, its background is described in connection with rotorcraft lubrication and cooling systems, and more particularly, with oil and oil filters.

Since their inception, rotorcraft and rotorcraft drive systems have been improved to reduce the possibility of failure during flight. Toward that end, a number of modifications have been made to drive systems to improve reliability. However, despite advances in materials and design, a number of failures continue to occur that affect rotorcraft performance. One example of a problem with current rotorcraft drive systems is that, in some instances, the failure of single drive system component leads to failure of the entire drive system. Another example is a loss of lubrication event that causes the loss of torque transmission by drive system subcomponents such as gearboxes or accessories connected to the main rotor gearbox.

More particularly, the failure of a single gearbox or shaft connected to the main rotor gearbox can significantly impact operations. For example, if there is a loss of lubrication to a gearbox, the gearbox loses torque transmission, causing damage to upstream or downstream components. The same can occur when a shaft becomes unbalanced (or breaks), which can damage couplings, gearboxes and even the main rotor gearbox. Unfortunately, when a portion of a drive system experiences a failure or reduction in performance, the concomitant reduction in power leads to challenges with flight performance.

Oil filters are crucial components of lubrication and cooling systems. Preventing oil filters from becoming clogged with contaminants and filtering less oil or no oil as a result of contaminant buildup is a safety issue as well as an operations issue, resulting in oil starvation. Maintenance of lubrication and cooling systems typically requires frequent and costly inspection and replacement of oil filters. For example, existing pressure lubricated systems either have an impending bypass visual indicator that tells the maintainer or crew of impending filter capacity close to being reached, or a bypass visual indicator that tells the maintainer or crew that the filter capacity has been reached. Either of these alone does not tell the maintainer if the filter element has been bypassed and the entire system needs to be flushed, cleaned, and inspected, or if the maintenance could be only a simple oil and filter change. Thus, there is a need for improving the overall safety and reliability of rotorcraft drive systems that includes systems and methods for efficient and effective inspection and maintenance of oil filters in rotorcraft.

SUMMARY OF THE INVENTION

In some embodiments of the disclosure, a removable oil filter system includes an oil filter mount, an oil filter element removably connected to the oil filter mount, an impending-bypass indicator connected to the oil filter mount and in fluid communication with an oil in the oil filter system, and a full-bypass indicator in fluid communication with the oil filter mount. The impending-bypass indicator is capable of reporting an impending-bypass condition of the oil filter system. The full-bypass indicator is capable of reporting a full-bypass condition of the oil filter system. Other embodiments may include a display, an on-board computer monitoring system, or a remote computer monitoring system communicably coupled to the impending-bypass indicator and/or the full-bypass indicator, wherein the impending-bypass indicator is configured to transmit the impending-bypass condition to the display, the on-board computer monitoring system, or the remote computer monitoring system, and/or the full-bypass indicator is configured to transmit the full-bypass condition to the display, the on-board computer monitoring system, or the remote computer monitoring system. Moreover, other embodiments may include determining a pressure level at the impending-bypass indicator, a contaminant level in the oil filter system, or an oil flow rate through the oil filter system, wherein the pressure level, the contaminant level, the oil flow rate or a combination thereof are used to determine whether the impeding-bypass condition exists. Furthermore, other components may be operably coupled in fluid communication with the oil filter mount, such as: an oil pressure regulator; an oil pressure transducer that is capable of converting an oil pressure measurement to an electrical signal; and/or one or more transfer tubes, wherein the one or more transfer tubes comprise an oil input tube the oil filter system, an oil output tube the oil filter system, or a oil bypass tube In some embodiments of the disclosure, a method of assessing a status of an oil filter system includes providing the oil filter system, which includes an oil filter mount and an oil filter element removably connected to the oil filter mount. An impending-bypass indicator connected to the oil filter mount and in fluid communication with an oil in the oil filter system, and a full-bypass indicator in fluid communication with the oil filter mount are provided. The impending-bypass indicator determines whether an impending-bypass condition exists, and provides an impending-bypass indication whenever the impending-bypass condition exists. The full-bypass indicator determines whether the bypass of the oil filter has occurred, and provides a bypass indication whenever the bypass of the oil filter has occurred. Other embodiments may include transmitting the impending-bypass indication to a display, an on-board computer monitoring system, or a remote computer monitoring system communicably coupled to the impending-bypass indicator; and/or transmitting the bypass indication to the display, the on-board computer monitoring system, or the remote computer monitoring system. Moreover, other embodiments may include determining a pressure level at the impending-bypass indicator, a contaminant level in the oil filter system, or an oil flow rate through the oil filter system, wherein the pressure level, the contaminant level, the oil flow rate or a combination thereof are used to determine whether the impeding-bypass condition exists. Furthermore, other components may be operably coupled in fluid communication with the oil filter mount, such as: an oil pressure regulator; an oil pressure transducer that is capable of converting an oil pressure measurement to an electrical signal; and/or one or more transfer tubes, wherein the one or more transfer tubes comprise an oil input tube the oil filter system, an oil output tube the oil filter system, or a oil bypass tube.

In some embodiments of the disclosure, a rotorcraft includes a fuselage, one or more engines coupled to the fuselage, and an oil filter system operably coupled to the one or more engines. The oil filter system includes an oil filter mount and an oil filter element removably connected to the oil filter mount, an impending-bypass indicator in fluid communication with the oil filter mount, and a full-bypass indicator in fluid communication with the oil filter mount. The impending-bypass indicator is capable of reporting an impending-bypass condition of the oil filter system. The full-bypass indication is capable of reporting a full-bypass condition of the oil filter systems. Other aspects may include additional features and functions described herein.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. There aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Figure 1:
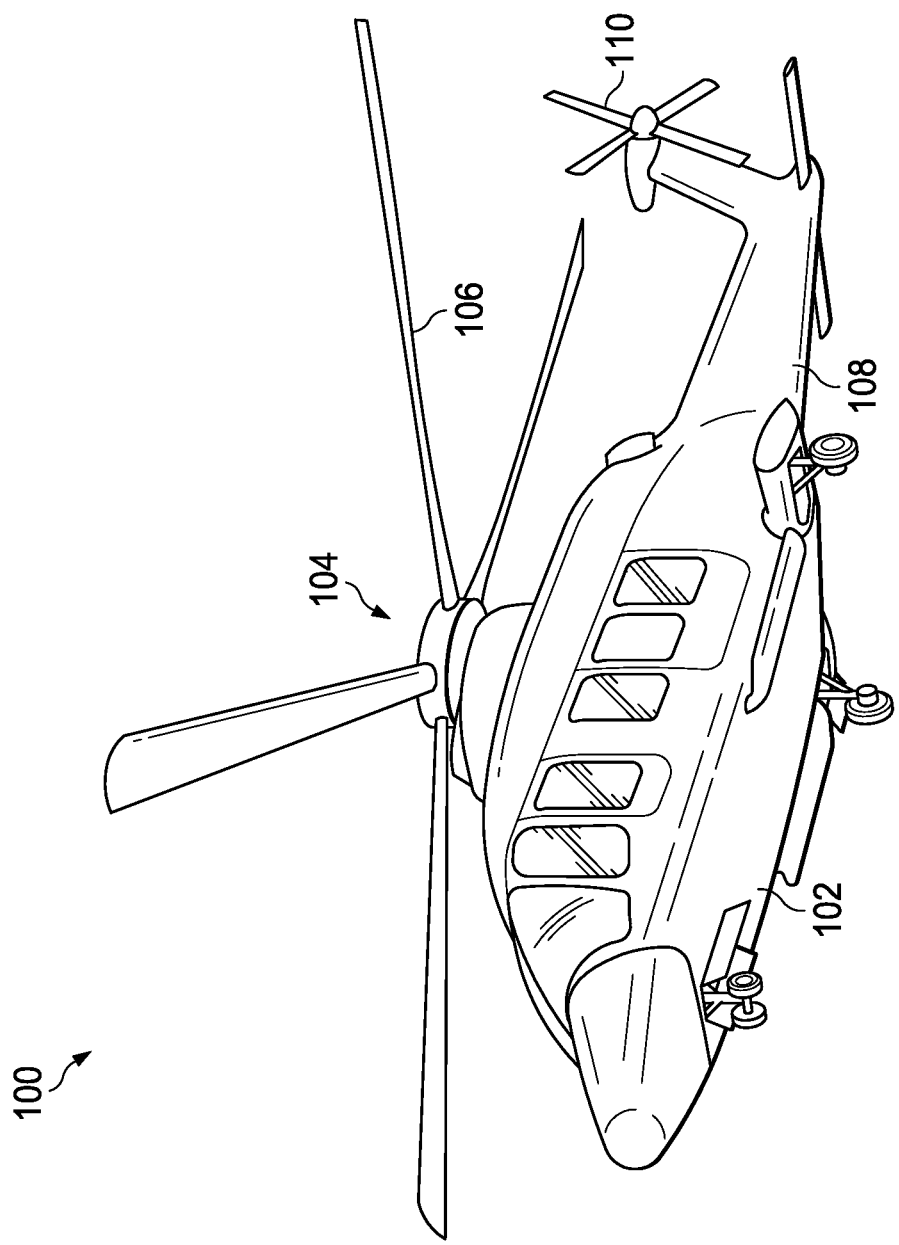
FIG. 1 shows a side view of a helicopter according to a particular embodiment of the present application.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention addresses the problems with drive systems in use today that are known to lead to rotorcraft failure. More particularly, the drive system of the present invention was designed to provide several benefits, most prominently, minimizing maintenance requirements and maintenance related incidents. The present invention reduces or eliminates the possibility of a reduced or contaminated lubrication environment by providing information on the status of an oil filter in the lubrication and cooling systems. The system of present invention may be attached directly to the Main Rotor Gearbox (MRGB) or any other pressurized gearbox. The present invention provides for improved and possibly greatly reduced maintenance and operation of the pressure lubricated gearboxes by indicating whether the filter and oil needs replacing or if the entire system requires flushing due to possible contamination. More specifically, the system is capable of providing two different filter condition indications: (1) an indication of impending bypass of the gearbox filter, and (2) an indication of full bypass of the gearbox filter.

These two indications may be provided by two separate sensors. For example, a first sensor may be configured to detect and indicate an impending-bypass condition or state. A second sensor may be configured to detect and indicate a full-bypass condition or state. Therefore, when there is an impending bypass, only the impending-bypass indication will be triggered. When there is a full bypass, the impending-bypass indication will be triggered, as well as the full-bypass indicator. In contrast, prior art systems have not been capable of providing both of these indications. As used herein, the terms sensor, indicator and detector are used interchangeably.

As a result, the present invention allows maintenance personnel to identify a maintenance need at the time of impending bypass—before full bypass of the filter. The maintenance required at the time of impending bypass may be less intensive (e.g., a simple change of fluid and filter) when compared to the maintenance required once the system is in full-bypass mode (e.g., a complete flush of the lubrication system, along with a change of fluid and filter). Therefore, at least one advantage of the present invention is that it may indicate an impending bypass, before the occurrence of a full-bypass event, so that less intensive maintenance operations can be performed earlier, to avoid more intensive maintenance operations after the occurrence of a full bypass.

Another potential advantage of the invention is that it may help prevent the operation of the gearbox with contaminated fluid. For example, maintenance personnel may use the system to identify an impending-bypass condition or state, and then change the fluid and filter before a full-bypass event occurs. Without the benefit of the current invention, maintenance personnel may not be aware of the impending-bypass condition or state, and, therefore, the fluid is not changed. During the next flight, a full-bypass event may occur, during which time contaminated fluid—which was contaminated enough to cause a full-bypass event—is allowed to circulate within the gearbox unfiltered. This can, in turn, cause damage or shorten the life of components such as bearing.

Another potential advantage is that the system provides an indication of full bypass. Therefore, maintenance personnel are aware that a full-bypass event has occurred (as opposed to just an impending bypass), and, therefore, they may complete the maintenance required following a full-bypass event (e.g., a complete flush of the lubrication system). These and other advantages will be apparent to those skilled in the art.

FIG. 1 shows an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with a rotor system 104 for creating flight. A tail boom 108 is depicted that further includes tail rotor 110.

Figure 2:
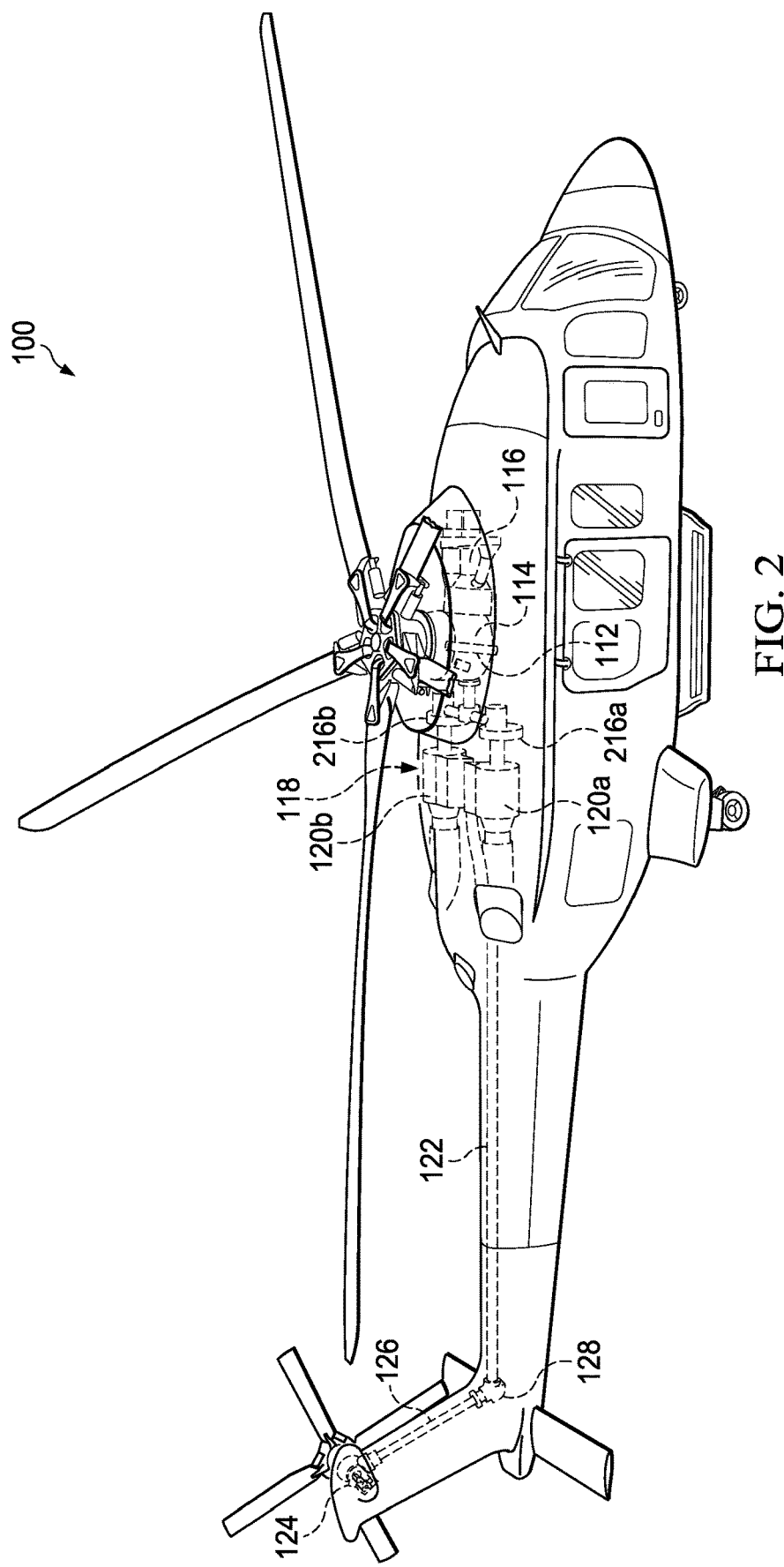
FIG. 2 shows a partial cross-section, perspective view of a helicopter according to an embodiment of the present application.

For example, FIG. 2 shows a partial cross-section perspective view of aircraft 100 that includes additional detail of an embodiment of the present invention. Aircraft 100 further includes a rotor mast 112, which is connected to the main rotor gearbox 114. The main rotor gearbox 114 is connected to one or more accessory gear boxes 116 and one or more reduction gearboxes 216a, 216b. Each reduction gearbox 216a, 216b is connected to one or more engines 120a, 120b, which are within an engine compartment 118. A tail rotor drive shaft 122 transmits mechanical rotation from the main rotor gearbox 114 to the tail rotor gear box 124, which is connected via tail rotor drive shaft 126 and intermediate gear box 128.

Figure 3A:
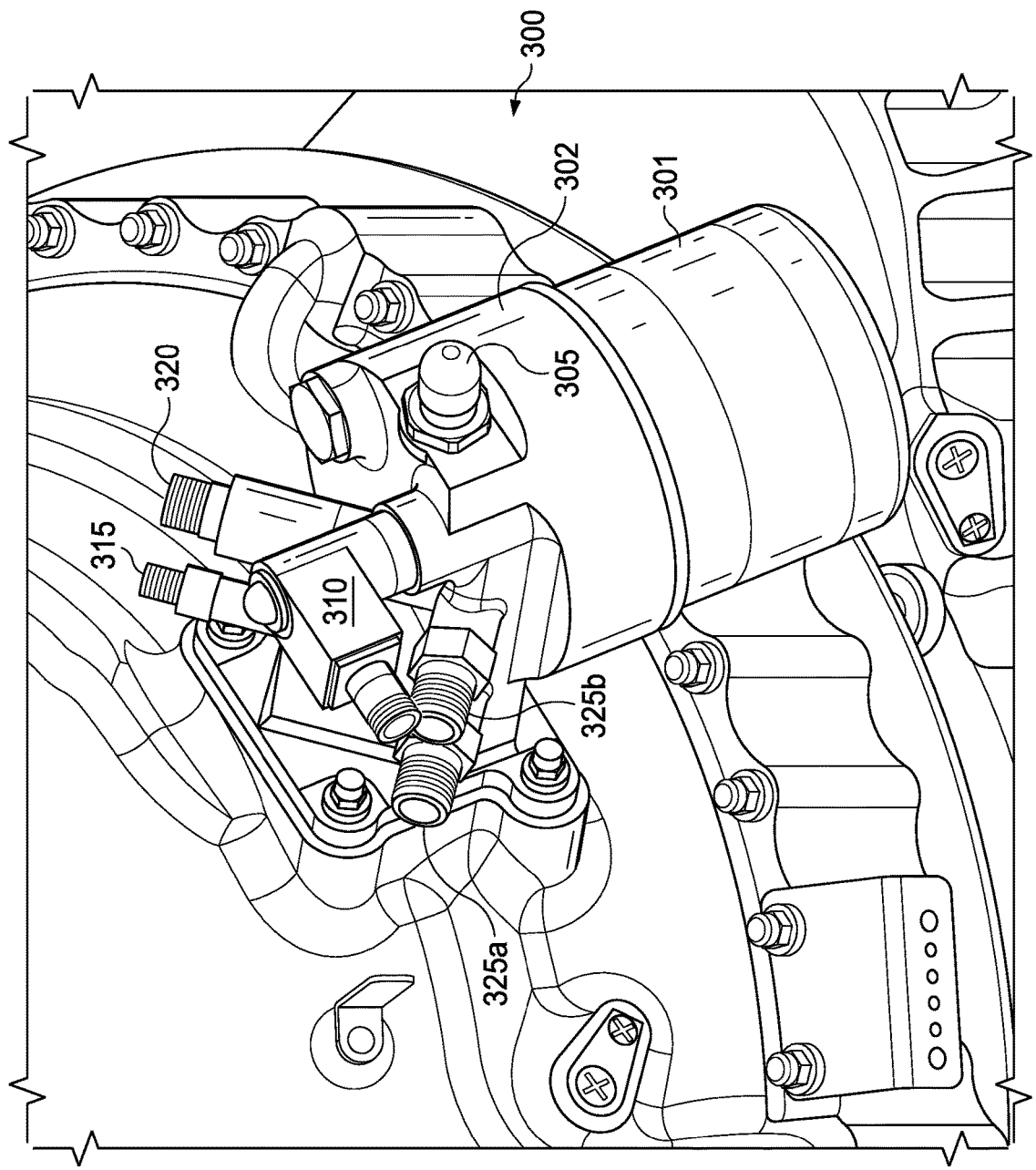
FIG. 3A shows a perspective view of an embodiment of the present invention, an oil filter system.

FIG. 3A shows an embodiment of the present invention, oil filter system 300. Oil filter systems such as oil filter system 300 are used in lubrication and cooling systems to filter out particulate matter. Such particulate contaminants reduce the lubrication and cooling capacities of the oil and wear down the components and systems being cooled and lubricated. As an oil filter traps particulate contaminants, the flow of oil through the filter is reduced. If this condition is allowed to worsen, a clogged oil filter will reduce the flow of oil so much that the component or system it serves cannot be adequately lubricated or cooled, a condition known as oil starvation. For this reason, an oil filter typically has a bypass feature; when the oil filter would otherwise not allow enough oil to flow through it, a bypass valve opens and oil flows through the valve, bypassing the oil filter element, such as an oil filter element (not shown) housed within element housing 301, and the components or system served by the filter are lubricated and cooled, but with contaminated oil, increasing wear. For this reason, oil filter elements must be frequently inspected and replaced.

Oil filter system 300 is removable from aircraft 100 and generally from any aircraft, including rotorcraft, in which it is to be used. Further, oil filter system 300 includes sensors and other features described herein so that those sensors and features may be removed with oil filter system 300 for easier servicing and replacement as necessary, thereby increasing safety and lowering operations and maintenance costs.

In one embodiment of the present invention, oil filter system includes an oil filter element within an oil filter housing 301, which is removably connected to oil filter mount 302. Oil filter system 300 is mounted to a system or component of aircraft 100 such as a gearbox (e.g., reduction gearbox 216a or 216b), and oil flows into and out of oil filter system 300 through oil filter mount 302. Oil filter system 300 further includes a full-bypass indicator 305 in fluid communication with oil filter mount 302 and an impending-bypass indicator 310 in fluid communication with oil filter mount 302.

Full-bypass indicator 305 is configured to sense and indicate a full-bypass condition or state. In the example of FIG. 3A, full-bypass indicator 305 is a mechanical pressure sensor, such as a spring-loaded pressure sensor. Full-bypass indicator 305 is located on oil filter mount 302 and at least partially exposed to the oil flow upstream of the filter element. When the pressure detected at full-bypass indicator 305 is high enough to indicate that the bypass valve has opened, the full-bypass indicator 305 will indicate the full-bypass condition or state. In the example of FIG. 3A, a full-bypass condition or state is indicated by a visible indicator or button that pops up in response to a full-bypass event. One skilled in the art will appreciate that, in alternative embodiments, full-bypass indicator 305 may utilize other sensor means to detect a full-bypass condition or state. For instance, full-bypass indicator 305 may, alternatively, use electronic pressure transducers, flow meters, hot-wire anemometers, etc. to identify conditions indicative of a full-bypass event.

Impending-bypass indicator 310 is configured to sense and to sense and to indicate an impending-bypass condition or state. In the example of FIG. 3A, impending-bypass indicator 310 includes a mechanical pressure sensor, such as a spring-loaded pressure sensor. Impending-bypass indicator 310 is located on oil filter mount 302 and at least partially exposed to the oil flow upstream of the filter element. When the pressure detected at impending-bypass indicator 310 is above a threshold indicating that the bypass valve may open in the near future, the impending-bypass indicator 310 will indicate the impending-bypass condition or state. In one nonlimiting example, the impending-bypass condition or state may be associated with a filter element that is 70% clogged. In the example of FIG. 3A, an impending-bypass condition or state is indicated by a visible indicator or button that pops up in response to an impending-bypass condition or state. The impending-bypass indicator 310 further includes an electronic pressure transducer configured to send a signal to the aircraft display when an impending-bypass condition or state occurs. Thus, in the example of FIG. 3A, impending-bypass indicator 310 provides an indication of an impending-bypass condition or state in two ways: (1) through the indicator/button that pops up, and (2) through the aircraft display, based on the signal sent by the electronic pressure transducer portion of the impending-bypass indicator 310. One skilled in the art will appreciate that, in alternative embodiments, impending-bypass indicator 310 may utilize other sensor means to detect an impending-bypass condition or state. For instance, impending-bypass indicator 310 may, alternatively, use flow meters, hot-wire anemometers, etc. to identify an impending-bypass condition or state. Other mechanisms and methods for detecting clogging or contamination of the oil filter, determining a capacity of the oil filter element, and whether a bypass of the oil filter element is likely or will soon occur can be used.

In the embodiment of FIG. 3A, full-bypass indicator 305 has no capability to send or transmit information to a remote display system, and it must be visually inspected to obtain an indication of a full-bypass condition or state, while impending-bypass indicator 310 is configured to provide a signal to the aircraft display indicating an impending-bypass condition or state. In another embodiment, full-bypass indicator 305 is capable of electronically reporting information, such as a full-bypass condition or state, to a display, an on-board computer monitoring system, a remote computer monitoring system, or other device communicably coupled to the full-bypass indicator 305. Impending-bypass indicator 310 is capable of reporting information to a display system, so that a visual inspection of impending-bypass indicator 310 is not required. Information from impending-bypass indicator 310 allows those responsible for maintaining the oil system to replace the oil filter element of oil filter system 300 or to change the oil before full-bypass condition or state is reached, enhancing safety while reducing operations and maintenance costs. In another embodiment, impending-bypass indicator 310 is capable of electronically reporting information, such as a full-bypass condition or state, to a display, an on-board computer monitoring system, a remote computer monitoring system, or other device communicably coupled to the impending-bypass indicator 310. Further, if a bypass valve is triggered, the appropriate maintenance response may be to flush the entire oil system. Full-bypass indicator 305 and impending-bypass indicator 310 can be a sensor, detector or other device capable of performing the functions described herein.

FIG. 3A further illustrates oil pressure regulator 315, oil pressure transducer 320, and temperature bulbs 325a, 325b. Oil pressure regulator 315 regulates oil pressure within oil filter system 300. Oil pressure transducer 320, which is in fluid communication with oil filter mount 302, converts an oil pressure within oil filter system 300 to an electrical signal, which may be used to display the oil pressure measurement within oil filter system 300 on a display, e.g., a control panel display or a maintenance display. Such an oil pressure measurement may be, e.g., a measurement of the difference in oil pressure across the oil filter element or the difference between the oil pressure inside and outside the oil filter element. Oil filter system 300 includes temperature bulbs 325a, 325b, which monitor the temperature of lubrication in system 300 and send signals to an aircraft display system indicative of the lubrication temperatures detected. One of the temperature bulbs 325a and 325b acts as a transducer, and the other acts as a switch.

Figure 3B:
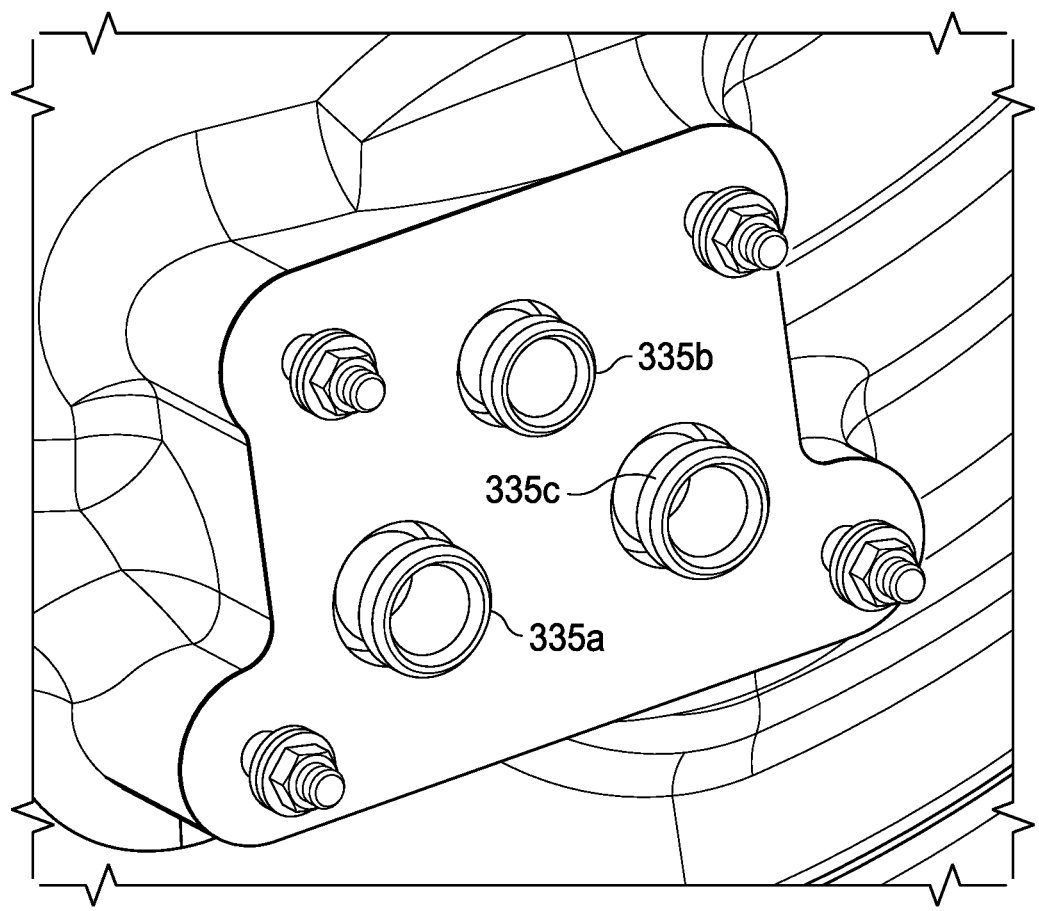
FIG. 3B illustrates transfer tubes of the oil filter system.

FIG. 3B illustrates transfer tubes 335a, 335b, and 335c of oil filter system 300. Transfer tubes 335a, 335b, and 335c are in fluid communication with oil filter mount 302. The input of oil to oil filter system 300, the bypass of oil flow, and the output of oil from oil filter system 300 take place using transfer tubes 335a, 335b, and 335c, with each of those flows using a separate transfer tube 335. The use of transfer tubes 335a, 335b, and 335c at pressurized interfaces greatly reduces the possibility of loss of lubricant due to fastener issues.

The skilled artisan will recognize that the functions described herein as performed by oil pressure regulator 315, oil pressure transducer 320, temperature bulbs 325a, 325b, and transfer tubes 335a, 335b, and 335c may be performed using different numbers of those items, and those items positioned differently, than the numbers and positions illustrated, depending on specific user requirements.

Figure 4:
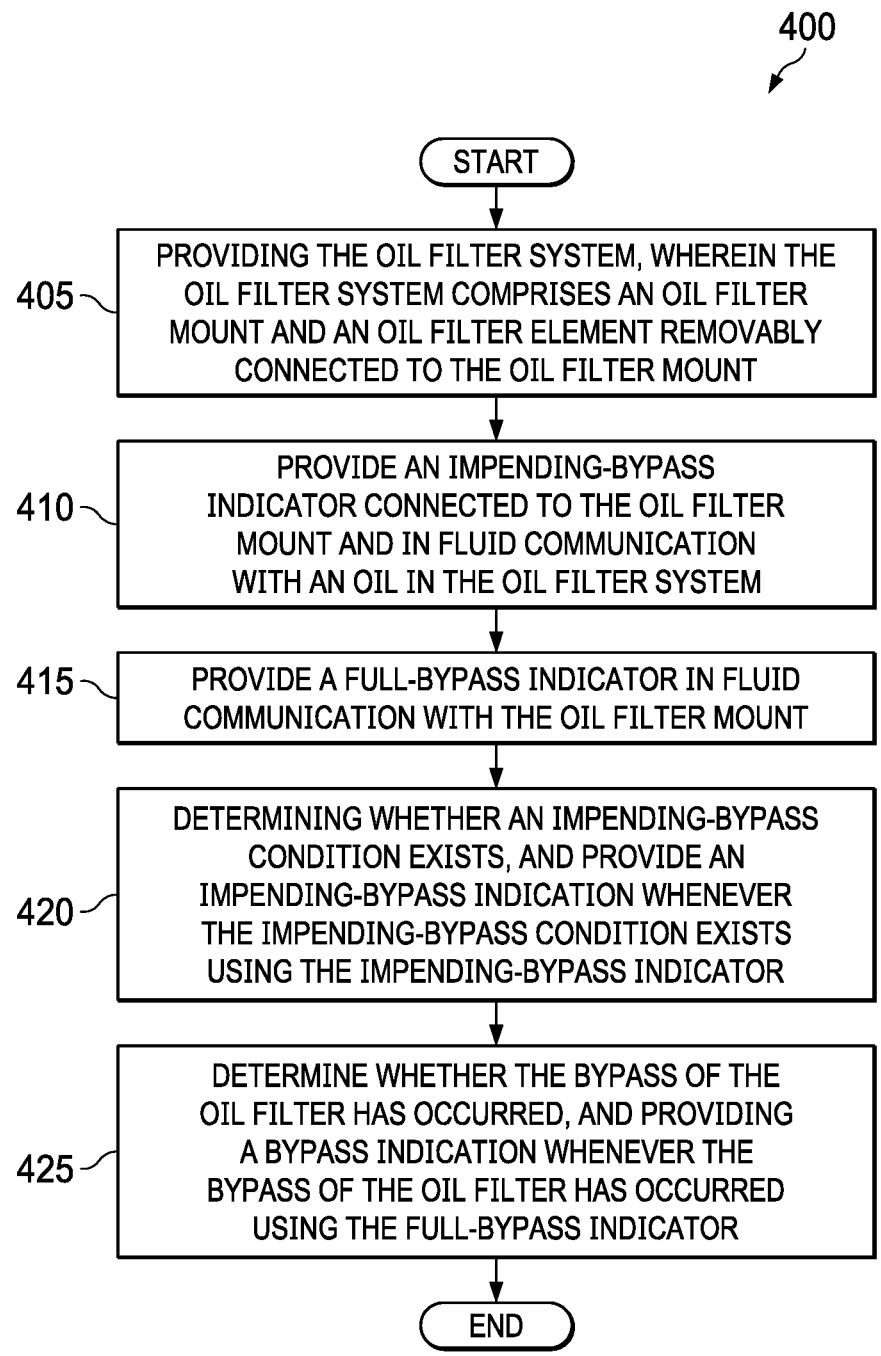
FIG. 4 shows a flowchart for a method embodiment of the present invention.

FIG. 4 a flowchart of a method 400 of assessing a status of an oil filter illustrates an embodiment of the present invention. An oil filter system is provided in block 405, which comprises an oil filter mount and an oil filter element removably connected to the oil filter mount. An impending-bypass indicator connected to the oil filter mount and in fluid communication with an oil in the oil filter system is provided in in block 410. A full-bypass indicator in fluid communication with the oil filter mount is provided in block 415. The impending-bypass indicator determines an impending-bypass condition exists, and provides an impending-bypass indication whenever the impending-bypass condition exists in block 420. The full-bypass indictor determines whether a bypass condition exits, and provides a bypass indication whenever the bypass condition exists in block 425.

In addition, the method 400 may include: transmitting the impending-bypass indication to a display, an on-board computer monitoring system, or a remote computer monitoring system communicably coupled to the impending-bypass indicator; and/or transmitting the bypass indication to the display, the on-board computer monitoring system, or the remote computer monitoring system. Moreover, the method 400 may determine a pressure level at the impending-bypass indicator, a contaminant level in the oil filter system, or an oil flow rate through the oil filter system, wherein the pressure level, the contaminant level, the oil flow rate or a combination thereof are used to determine whether the impeding-bypass condition exists. Other components may be operably coupled in fluid communication with the oil filter mount, such as: an oil pressure regulator; an oil pressure transducer that is capable of converting an oil pressure measurement to an electrical signal; and/or one or more transfer tubes, wherein the one or more transfer tubes comprise an oil input tube the oil filter system, an oil output tube the oil filter system, or a oil bypass tube.

The skilled artisan will recognize that embodiments of the present invention such as oil filter system 300 and method 400 provide information about oil filter system 300 that prevents damaging build-ups of particulate contaminants in the oil of a cooling or lubrication system, in oil filter system 300, or both.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A removable oil filter system, comprising:
   an oil filter mount;
   an oil filter element removably connected to the oil filter mount;
   an oil pressure regulator in fluid communication with the oil filter element and the oil, wherein the oil pressure regulator comprises a temperature bulb, an oil pressure transducer, and first and second transfer tubes, wherein the first transfer tube is an oil output and the second transfer tube is an oil flow bypass;
   an impending-bypass indicator connected to the oil filter mount and in fluid communication with an oil in the oil filter system, wherein the impending-bypass indicator is capable of reporting an impending-bypass condition of the oil filter system; and
   a full-bypass indicator in fluid communication with the oil filter mount and capable of reporting a full-bypass condition of the oil filter system.

2. The system of claim 1, further comprising a display, an on-board computer monitoring system, or a remote computer monitoring system communicably coupled to the impending-bypass indicator, wherein the impending-bypass indicator is configured to transmit the impending-bypass condition to the display, the on-board computer monitoring system, or the remote computer monitoring system.

3. The system of claim 1, further comprising a display, an on-board computer monitoring system, or a remote computer monitoring system communicably coupled to the full-bypass indicator, wherein the full-bypass indicator is configured to transmit the full-bypass condition to the display, the on-board computer monitoring system, or the remote computer monitoring system.

4. The system of claim 1, further comprising an oil pressure regulator in fluid communication with the oil filter mount.

5. The system of claim 1, wherein the oil pressure transducer is capable of converting an oil pressure measurement to an electrical signal.

6. The system of claim 1, further comprising one or more transfer tubes in fluid communication with the oil filter mount, wherein the one or more transfer tubes comprise an oil input tube the oil filter system, an oil output tube the oil filter system, or an oil bypass tube.

7. A method of assessing a status of an oil filter system, comprising:
- providing the oil filter system, wherein the oil filter system comprises an oil filter mount and an oil filter element removably connected to the oil filter mount;
- providing an oil pressure regulator in fluid communication with the oil filter element and the oil, wherein the oil pressure regulator comprises a temperature bulb, an oil pressure transducer, and first and second transfer tubes, wherein the first transfer tube is an oil output and the second transfer tube is an oil flow bypass;
- providing an impending-bypass indicator connected to the oil filter mount and in fluid communication with an oil in the oil filter system;
- providing a full-bypass indicator in fluid communication with the oil filter mount;
- determining whether an impending-bypass condition exists, and providing an impending-bypass indication whenever the impending-bypass condition exists using the impending-bypass indicator; and
- determining whether the bypass of the oil filter has occurred, and providing a bypass indication whenever the bypass of the oil filter has occurred using the full-bypass indicator.

8. The method of claim 7, further comprising transmitting the impending-bypass indication to a display, an on-board computer monitoring system, or a remote computer monitoring system communicably coupled to the impending-bypass indicator.

9. The method of claim 7, further comprising transmitting the bypass indication to a display, an on-board computer monitoring system, or a remote computer monitoring system communicably coupled to the full-bypass indicator.

10. The method of claim 7, further comprising determining a pressure level at the impending-bypass indicator, a contaminant level in the oil filter system, or an oil flow rate through the oil filter system, wherein the pressure level, the contaminant level, the oil flow rate or a combination thereof are used to determine whether the impeding-bypass condition exists.

11. The method of claim 7, further comprising operably coupling an oil pressure regulator in fluid communication with the oil filter mount.

12. The method of claim 7, wherein the oil pressure transducer is capable of converting an oil pressure measurement to an electrical signal.

13. The method of claim 7, further comprising operably coupling one or more transfer tubes in fluid communication with the oil filter mount, wherein the one or more transfer tubes comprise an oil input tube the oil filter system, an oil output tube the oil filter system, or a oil bypass tube.

14. A rotorcraft, comprising:
- a fuselage;
- one or more engines coupled to the fuselage;
- an oil filter system operably coupled to the one or more engines, wherein the oil filter system comprises:
  - an oil filter mount;
  - an oil filter element removably connected to the oil filter mount;
  - an oil pressure regulator in fluid communication with the oil filter element and the oil, wherein the oil pressure regulator comprises a temperature bulb, an oil pressure transducer, and first and second transfer tubes, wherein the first transfer tube is an oil output and the second transfer tube is an oil flow bypass;
  - an impending-bypass indicator in fluid communication with the oil filter mount, wherein the impending-bypass indicator is capable of reporting an impending-bypass condition of the oil filter system; and
  - a full-bypass indicator in fluid communication with the oil filter mount and capable of reporting a full-bypass condition of the oil filter system.

* * * * *